Patented Mar. 12, 1946

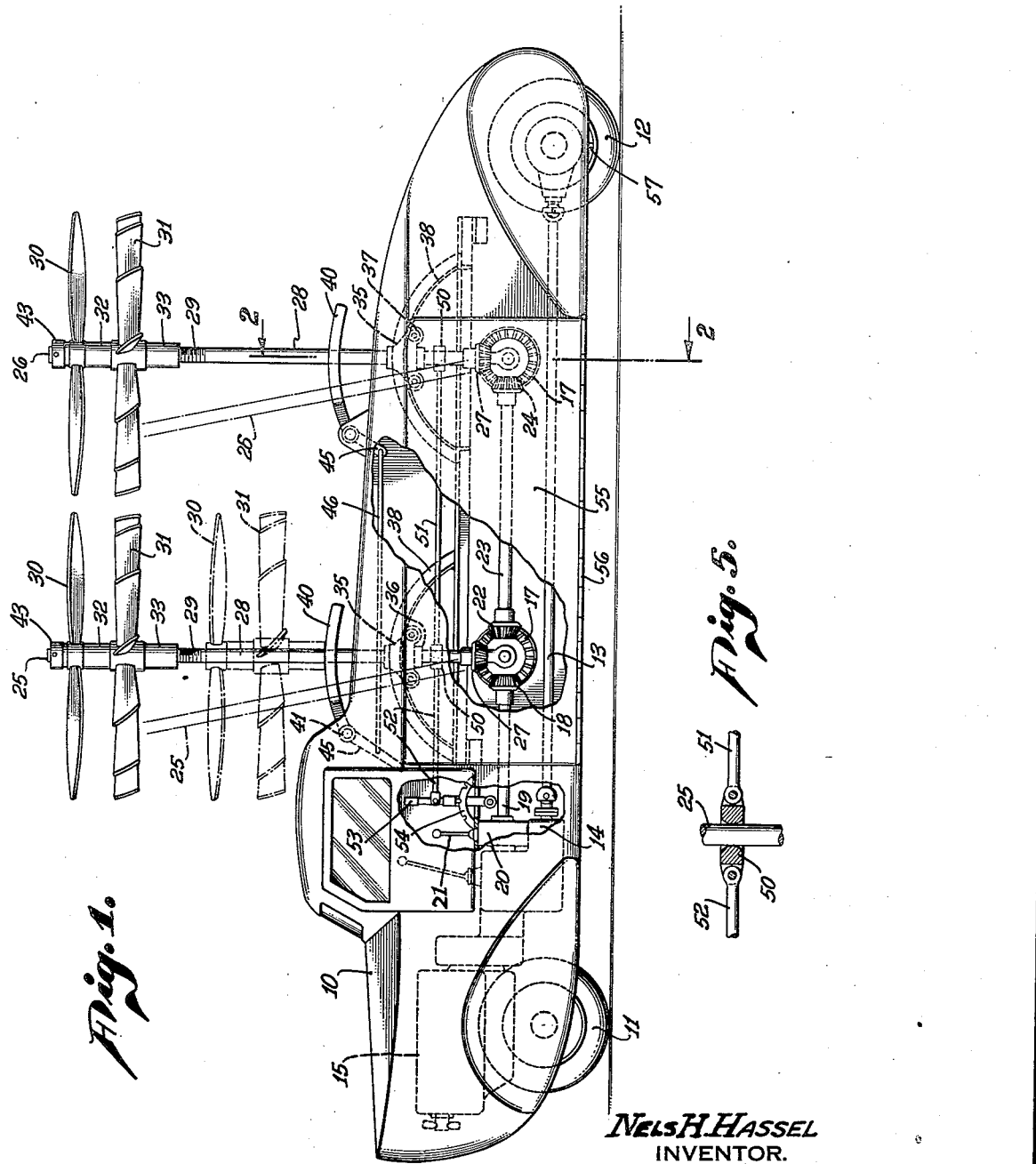

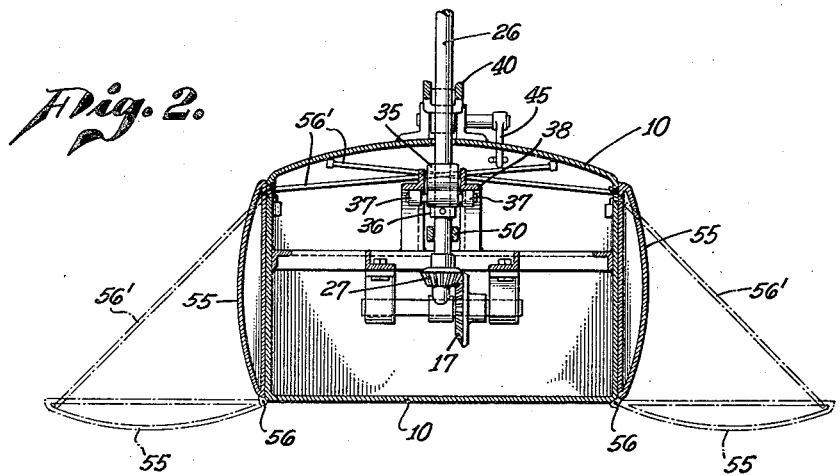
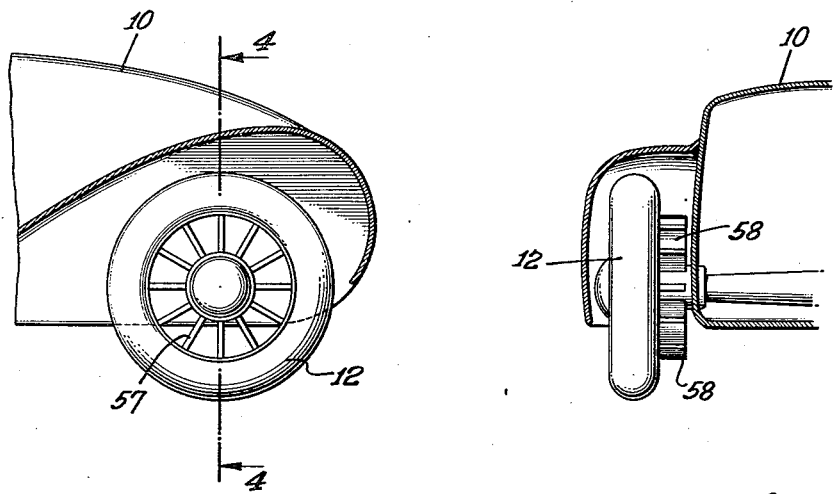
Nels H. Hassel,
INVENTOR.
BY [signature]
ATTORNEY.

2,396,419

UNITED STATES PATENT OFFICE 2,396,419

AERO CAR AND PROPELLER CONSTRUCTION THEREFOR

Nels H. Hassel, Los Angeles, Calif.

Application March 27, 1943, Serial No. 480,756

2 Claims. (Cl. 170—135.5)

This invention relates to a vehicle which may be termed an aero car of the class designed for propulsion on the ground, in the air and on water, and having propellers for effecting propulsion and sustentation. The principal objects of my invention are to provide an arrangement wherein the propellers may be displaced along their shafts between operative and inoperative positions, and to provide suitable mechanism for effecting such displacement of the propellers.

Other objects and advantages will appear from the following description and drawings. Referring to the drawings, which are for illustrative purposes only—

Fig. 1 is a side elevation partly in section of a vehicle embodying a form of my invention;

Fig. 2 is a cross section on lines 2—2 of Fig. 1;

Fig. 3 is a fragmentary view partly in section showing one of the rear wheels of the vehicle;

Fig. 4 is a sectional view on line 4—4 of Fig. 3; and

Fig. 5 is a side elevation, partly in section, showing one of the propeller driving shafts and engaging mechanism for changing the angular position of such shaft.

Referring more particularly to the drawings, 10 designates a car body which may be of any suitable construction; 11 designates the front wheels and 12 the rear wheels, there being two front and two rear wheels as is the ordinary construction of automobiles and the like. 13 designates a drive shaft for the rear wheels which is driven through the ordinary transmission and gear shift diagrammatically indicated at 14, from the power unit indicated at 15.

Arranged in the body of the car are two bevelled gear wheels indicated at 17, the forward gear wheel being driven by means of a pinion 18 on shaft 19 through a clutch diagrammaticaly indicated at 20 from the transmission and power unit heretofore mentioned. The clutch 20 is operated by a clutch lever 21 by means of which it is understood that the shaft 19 and the shaft 13 may be selectively driven. The forward gear 17 is engaged by a pinion 22 on a shaft 23 which extends to a pinion 24 which drives the rear gear 17.

The vehicle is provided with two vertically extending propeller drive shafts 25 and 26 each having on their lower end a pinion 27 driven by the rear wheels 17. The lower portion of the propeller drive shafts 25 and 26 are smooth as indicated at 28 and the upper ends of such shafts are threaded as indicated at 29, preferably with a thread having a comparatively steep angle. Numeral 30 designates screw propellers on the shafts 25 and 26 and below each screw propeller 30 is a vane propeller 31. The propellers 30 and 31 are spaced apart from each other by sleeves 32 loosely mounted on the respective shafts 25 and 26. The vane propellers 31 have a hub formed thereon indicated at 33. The propellers 30 and 31 and the hubs 33 are interiorly threaded to engage the threads indicated at 29 on the upper portion of the shafts 25 and 26, being so arranged that they are freely slidable over the smooth portion of the respective shafts. It may be said that these drive shafts 25 and 26, by reason of the engagement of the pinions 27 with the gear wheels 17, are free to have a pivotal movement. To prevent upward movement of the shafts 25 and 26 I have provided carriages indicated at 35 loosely mounted on their associated shafts 25 and 26. A collar indicated at 36 is secured to such shafts under the respective carriages as is clearly shown in Fig. 2. The carriages 35 are each provided with rollers 37 which engage the underside of arcuate tracks 38 mounted in any suitable manner on the framework of the car.

When the propellers are not being driven for raising the vehicle off the ground the propellers move downwardly from the threaded portion of the shafts 25 and 26 due to the steep threads on the shafts to the smooth portions of the shafts where they assume the position shown in broken lines on the shafts 25 and 26. When the shafts 25 and 26 are driven a fork indicated at 40, pivotally mounted as indicated at 41, is raised and by reason of the engagement of the fork with the hub 33 the propellers are lifted on to the threaded portions of the shafts and when the thread engagement is so made the propellers due to such engagement assume the upper position shown in full lines in Fig. 1. A collar indicated at 43 on the respective driving shafts 25 and 26 prevent further upward movement of the propellers. A lever 45 is provided for each fork, such levers being connected by means of a rod 46 so that the forks 40 may be moved in unison.

When the propellers have raised the car off the ground, the car may be caused to move either forwardly or rearwardly according to the angular position of the drive shafts 25 and 26. These shafts are moved simultaneously into angular position in the following manner: On each shaft 25 and 26 is mounted a loose collar 50. The collars 50 on the two driving shafts are connected by a rod 51 and the collar 50 on the shaft 25 is connected by a rod 52 to a hand lever 53 movable over and engageable with a quadrant 54. As shown in Figs. 1 and 2 the car is preferably provided with hollow panels 55 pivotally connected to the body as indicated at 56. These panels are designed to be lowered into the broken line position shown in Fig. 2 to afford additional buoyancy to the car when the car is being used for travel by water. Lift rods 56' are pivotally connected to the panels at their lower end, such rods being detachably secured in any suitable manner at their upper ends to the car body when the panels are in lowered position.

For propulsion of the vehicle on water the rear wheels 12 are provided with spokes 57 which have inward extensions, indicated at 58 in Fig. 4, forming paddles or blades for propelling the vehicle.

The lifting of the vehicle from the ground is performed primarily by the screw propellers 30 and the purpose of the arrangement of the vane propellers 31 is to aid in such lifting and to lighten the load on the screw propellers. This latter feature is accomplished due to the fact that the air stream from the screw propellers acts against the vanes of the vane propellers thereby assisting in their rotative movement.

I claim as my invention:

1. In a vehicle of the character described: a body; a propeller; a shaft for driving the propeller, said shaft having its axis substantially vertically disposed and having a threaded portion at its upper end; an abutment means at the upper end of said shaft; a hub on the propeller interiorly threaded to engage the threaded portion of the shaft; a smooth portion on the shaft below the threaded portion adapted to receive the hub of the propeller; means mounted on said body for driving said shaft; and means for lifting the propeller from the smooth portion of the shaft to the threaded portion during rotation of the shaft, said lifting means forming a support for the propellers when the propellers are on the smooth portion of the shaft.

2. In a vehicle of the character described: a body; a propeller; a shaft for driving the propeller, said shaft having its axis substantially vertically disposed and having a threaded portion at its upper end; an abutment means at the upper end of said shaft; a hub on the propeller interiorly threaded to engage the threaded portion of the shaft; a smooth portion on the shaft below the threaded portion adapted to receive the hub of the propeller; means mounted on said body for driving said shaft; and means for lifting the propeller from the smooth portion of the shaft to the threaded portion during rotation of the shaft, said propeller lifting means comprising a pivotally mounted fork for receiving said shaft and engaging the hub portion of the propeller, said lifting means forming a support for the propellers when the propellers are on the smooth portion of the shaft.

NELS H. HASSEL.